Feb. 5, 1957　　　C. H. FORSYTH　　　2,780,478
HITCH MECHANISM FOR CONNECTING IMPLEMENTS IN TANDEM
Filed Dec. 16, 1953
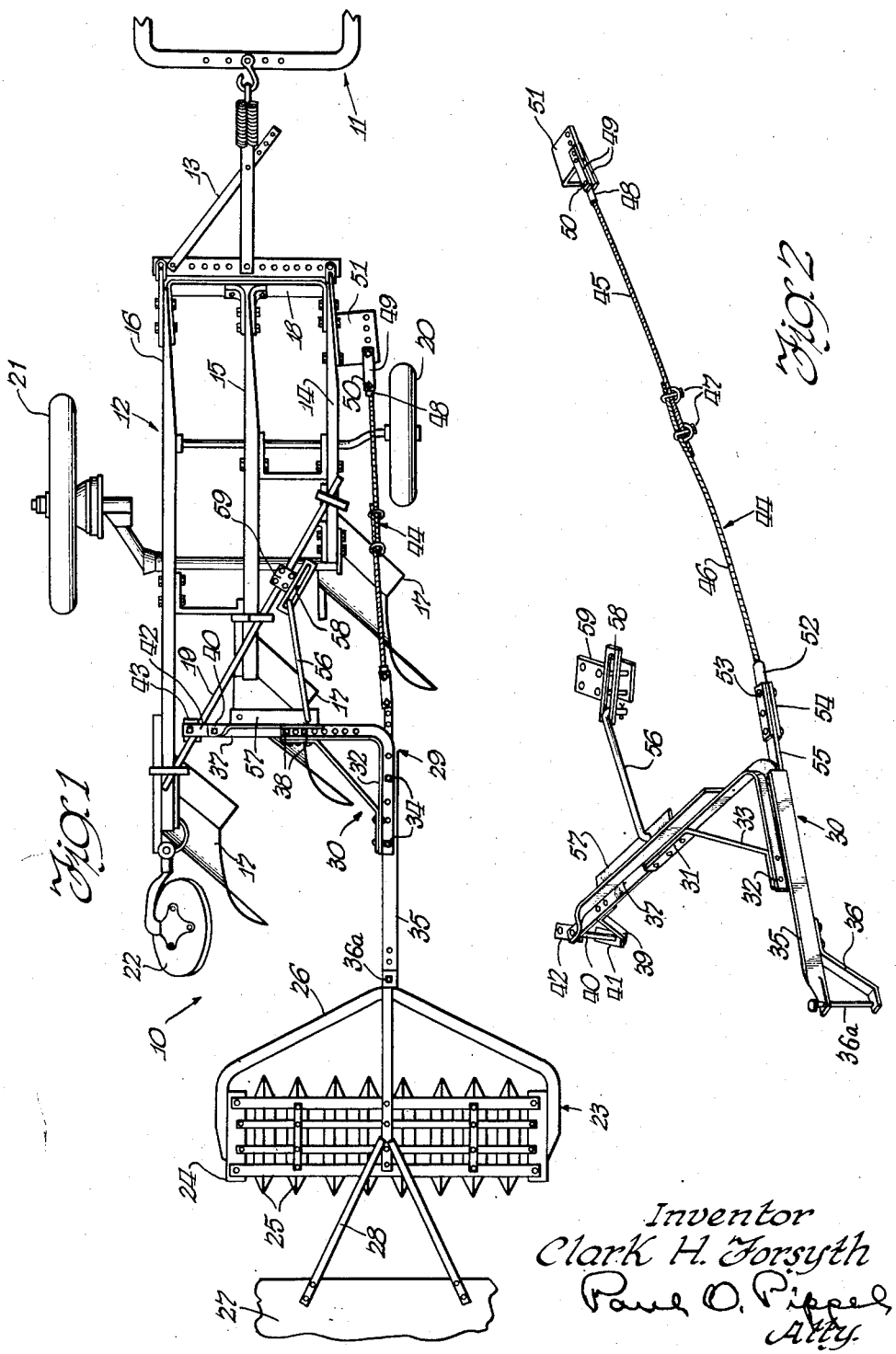
Inventor
Clark H. Forsyth
Paul O. Pippel
Atty.

United States Patent Office 2,780,478
Patented Feb. 5, 1957

2,780,478

HITCH MECHANISM FOR CONNECTING IMPLEMENTS IN TANDEM

Clark H. Forsyth, Hamilton, Ontario, Canada, assignor to International Harvester Company, a corporation of New Jersey Application December 16, 1953, Serial No. 398,556

9 Claims. (Cl. 280—411)

This invention relates to agricultural implements and particularly to the connection of a plurality of implements together in tandem relation to be propelled by a tractor or the like, to perform a number of operations in the soil at one time. More specifically the invention concerns novel hitch means connecting the implements.

The invention is described particularly in relation to a compound machine of the type referred to as a plow press drill, wherein the soil is tilled by plowing or the like, the surface of the ground prepared, furrows formed and seed deposited. This kind of implement combination includes a moldboard plow attached directly to the tractor in trailing relation, a tool such as a land packer for breaking up clods turned by the plow connected to the rear end of the plow, and a grain drill connected in tandem with the packer and the plow. Where this type of machinery is used, the equipment is heavy. When the plow encounters obstructions temporarily impeding its forward motion, considerable strain is placed upon the hitch connections between the implements and particularly to the plow by the forward motion of the heavy packer and drill due to their inertia. An object of the invention, therefore, is the provision of improved connecting means between the components of machinery of this type.

Another object of the invention is the provision of improved hitch mechanism connecting the rear components of tandem implements to the forward components, particularly where the forward components are subject to stalling, to offset the effects of the forward momentum of the rear components.

A further object of the invention is the provision in mechanism of the type referred to above, of novel flexible hitch means connecting a trailing implement to a vehicular structure wherein sufficient lost motion is provided in the connections to limit the advance of the trailing implement upon stalling of the vehicular structure or forward implement component upon stalling or encountering of obstructions by the latter.

Other objects and advantages of the invention will become clear from the following detailed description when read in conjunction with the accompanying drawings, wherein:

Figure 1 is a plan view of a compound agricultural machine having incorporated therein a hitch structure illustrating the features of this invention; and Figure 2 is a perspective view of the hitch structure shown in Figure 1, disassembled from the implements.

Referring to the drawings, the machine of this invention is designated generally by the numeral 10 and is connected to a vehicle such as a tractor 11 by which the machine is propelled over the ground.

The machine 10 is adapted to perform a number of operations on the soil and comprises a vehicular structure in the form of a moldboard plow 12 which is provided with a conventional hitch 13 connected to the tractor 11 in trailing relation. The general construction of the plow 12 is conventional and includes laterally spaced beams 14, 15 and 16 of different length, carrying at their rear ends diagonally arranged plow bottoms 17. The forward ends of the beams are connected by a transverse member 18 and at their rear ends by a diagonal frame bar 19 so that the rear end supporting structure extends diagonally of the direction of travel. The plow frame is supported by forward wheels 20 and 21 and a rear furrow wheel 22.

Mounted in tandem relation behind the plow 12 is a land packer 23 comprising generally a transverse frame 24 supporting disk-like roller members 25 adapted to break up clods and prepare the ground for seed bed formation. The land packer 23 is provided with a hitch frame 26 for connection to the moldboard plow in trailing relation, and behind is another implement such as a grain drill 27 having a hitch frame 28 for connection to the frame of the packer 23.

While the components of the machine 10 are shown generally diagrammatically, it may be understood that, as pointed out before, the land packer and drill are heavy machines, the drill rolling on supporting wheels and the land packer on its disks 25. Thus any forward motion of the packer and drill relative to the vehicles ahead thereof places a great strain upon the connection therebetween. Since this strain is principally upon the plow 12, the hitch mechanism incorporating the features of this invention has been devised to offset the effects of the momentum of the packer and drill when the plow stalls by virtue of the bottoms 17 encountering obstructions.

The hitch mechanism of this invention is designated by the numeral 29 and includes a rectangular frame member 30. The frame member 30 comprises right angled arms 31 and 32 in the form of angle bars braced by a cross piece 33. The arm 32 has secured thereto by bolts 34 an angle bar extension 35, the rear end of which is apertured and has secured thereto a bracket 36 likewise apertured to receive a pivot pin 36a extending therebetween for pivotal connection of the hitch member 30 to the hitch frame 26 of the packer. A plurality of openings are provided in the arm 32 and extension 35 for reception of the bolts 34, whereby the position of the angle bar 35 may be adjusted to vary the effective length of the arm 32.

The other arm 31 of the member 30 has secured thereto another angle bar 37 similar to angle bar 35 and adjustably affixed to the arm 31 by bolts 38 for varying the effective length of the arm 31. It will be noted that arm 32 and its extension 35 of the hitch member 30 extend horizontally and longitudinally in the direction of travel of the machine and that the arm 34 with its extension 37 is transverse to the direction of travel.

The end of extension 37 and a bracket 39 secured thereto are apertured to receive a vertical hinge pin 40 upon which are mounted a pair of vertically spaced pivoted links 41 and 42. These links are pivotally mounted on a plate 43 affixed near the rear end of the diagonal frame bar 19. It should thus be clear that the hitch member 30 is movable in a horizontal plane about the hinge pin 40 as an axis so that the packer and drill connected thereto can be advanced or retracted relative to the plow 12 and the tractor 11.

Draft is transmitted from the plow to the packer and drill by means of a flexible draft member 44 comprising a cable having forward and rearward sections 45 and 46, respectively, adjustably connected by clamping means 47 by which the length of the member 44 may be varied. The forward end of cable section 45 is provided with a bar 48 received between a pair of bars 49 and pivotally connected thereto by a pin 50. The bars 49 are adjustably connected to an angle bracket 51 affixed to the forward end of the plow beam 14. The rear end of section 46 of the cable is provided with a similar bar 52 pivotally connected by a pin 53 to a pair of bars 54 secured to a lug 55 affixed to the frame member 30 at its apex. At this point it should be clear that the hitch mechanism 29 provides a draft connection between the plow and the implements mounted therebehind and has the flexible draft cable 44 which is yieldable to accommodate advance of the packer and drill relative to the plow to avoid damage to the implement when adverse conditions are encountered by the plow.

The free movement of the packer and drill toward the plow when the latter is stalled is relatively small but is limited by stop mechanism which includes a rigid longitudinally extending link 56 pivotally connected at its rear end to a plate 57 affixed to and projecting forwardly from the angle bar 37. The forward end of the link 56 is bent downwardly and the end thereof is slidably received in a diagonally extending slot 58 formed in a member 59 affixed to the diagonal bar 19 between the ends thereof. Upon advance of the packer and drill toward the plow, as when the plow is stalled or when the machine is going downhill, the flexible draft member 44 yields, bar 37 pivots forwardly about the axis of pin 40, and the end of the link 56 slides forwardly in the slot 58, the length of the slot determining the extent of forward motion thereof.

Different size plows may be used in combination with the packer and drill to be drawn by the tractor 11, and adjustment of the hitch member 30 to accommodate it to the larger or smaller plow may be made by adjustment of the bars 35 and 37 relative to the arms 32 and 31, respectively. Further adjustment may be made in the length and point of attachment of the flexible draft member 44 to the plow.

The operation of the hitch mechanism of this invention should be clearly understood from the foregoing description. It should likewise be understood, of course, that modifications may be made in the invention without departing from the spirit thereof or the scope of the appended claims.

What is claimed is:

1. The combination of a tractor, first and second implements in tandem, draft means connecting the first implement to the tractor, and means connecting the second implement to the first implement, said last mentioned means including a flexible member adapted to transmit draft between the first and second implements and yieldable upon advance of the second implement relative to the first implement, and also including a rigid member separate from said flexible member, the connection of said rigid member to the implements including lost motion means limiting the advance of the second implement relative to the first implement.

2. The combination of a tractor, first and second implements in tandem, draft means connecting the first implement to the tractor, and means connecting the second implement to the first implement, said last mentioned means including a hitch member pivotally connected to the first and second implements to accommodate relative longitudinal movement therebetween, a flexible draft-receiving member connected to the first implement and to the hitch member at a location laterally spaced from the latter's connection to the first implement, and yieldable to accommodate advance of the second implement relative to the first implement, and a rigid member forming a connection between said hitch member and said first implement, said latter connection including lost motion accommodating limited advance of the second implement relative to the first implement.

3. The combination of a tractor, first and second implements in tandem, draft means connecting the first implement to the tractor, and means connecting the second implement to the first implement, comprising a rigid hitch member pivotally connected at one end to the first implement and at its other end to the second implement at a location laterally spaced from its connection to the first implement, and a rigid link pivotally connected to the first implement and to the hitch member at a location laterally spaced from the latter's connection to the first implement, the connection of said rigid link to the first implement including lost motion accommodating limited advance of the second implement relative to the first implement about the pivotal connection of said hitch member to the first implement.

4. The combination of a tractor, first and second implements in tandem, draft means connecting the first implement to the tractor, and means connecting the second implement to the first implement, comprising a rigid hitch member pivotally connected at one end to the first implement and at its other end to the second implement at a location laterally spaced from its connection to the first implement, and a rigid link pivotally connected to the first implement and to the hitch member at a location laterally spaced from the latter's connection to the first implement, the connection of said rigid link to the first implement including lost motion accommodating limited advance of the second implement relative to the first implement about the pivotal connection of said hitch member to the first implement, and a yieldable draft member connected to the first implement and said hitch member at a location laterally spaced from the connection of the latter to the first implement, and yieldable to accommodate said advance of the second implement relative to the first implement.

5. The invention set forth in claim 4, wherein the hitch member is of angular shape having a longitudinal horizontal part connected to the second implement and a transverse horizontal part connected to the first implement and to which said rigid link and said yieldable member are connected.

6. The combination of a vehicular structure adapted to be propelled over the ground, an implement in tandem relation to said structure, and draft means connecting the implement to said structure to be drawn thereby, comprising a laterally extending rigid hitch member pivotally connected at one end to said implement, a flexible member connecting the other end of said hitch member to the vehicular structure in draft-transmitting relation, and a rigid link laterally spaced from said flexible member pivotally connecting the hitch member to the vehicular structure, said latter connection including lost motion accommodating limited advance of the implement relative to said vehicular structure.

7. The invention set forth in claim 6, wherein said hitch member includes a longitudinally extending portion pivotally connected to the implement and a transverse portion pivotally connected to said vehicular structure at a location laterally spaced from the connection of the hitch member to the implement, whereby the implement may advance relative to the vehicular structure about the pivotal connection of said hitch member thereto.

8. The combination of a vehicular structure adapted to be propelled over the ground, an implement in tandem relation to said structure, and draft means connecting the implement to said structure, comprising a rigid hitch member having a longitudinally extending horizontal portion pivotally connected to the implement in draft-receiving relation and a transverse portion pivotally connected to said structure at a location laterally spaced from the connection of said member to the implement, whereby the implement is longitudinally movable relative to said structure about the connection of the hitch member thereto, a draft member connecting the vehicular structure to the hitch member in substantial alignment with the longitudinal portion thereof for transmitting draft to the implement, said draft member being flexible to accommodate advance of the implement relative to said structure, and stop means between the implement and said vehicular structure comprising a rigid link pivotally connected to the implement and the vehicular structure by means including lost motion to accommodate and limit the advancing of the implement relative to the tractor.

9. The invention set forth in claim 8, wherein said rigid link is pivotally connected at its rear end to the implement and its forward end is received in a slot provided in a bracket carried by the vehicular structure.

References Cited in the file of this patent

UNITED STATES PATENTS

| | | |
|---|---|---|
| 655,062 | Daverkosen | July 31, 1900 |
| 962,701 | De Witt | June 28, 1910 |
| 1,463,243 | Bley | July 31, 1923 |
| 1,750,514 | Gates | Mar. 11, 1930 |
| 1,830,739 | Lang | Nov. 3, 1931 |